United States Patent [19]

Machado

[11] Patent Number: 5,166,253

[45] Date of Patent: Nov. 24, 1992

[54] FILLED POLYKETONE BLEND CONTAINING A MINERAL WOOL FIBER

[75] Inventor: Joseph M. Machado, Richmond, Tex.

[73] Assignee: Shell Oil Company, Houston, Tex.

[21] Appl. No.: 766,256

[22] Filed: Sep. 27, 1991

[51] Int. Cl.⁵ ............................................. C08K 3/34
[52] U.S. Cl. .................................................. 524/452
[58] Field of Search ........................................ 524/452

[56] References Cited

U.S. PATENT DOCUMENTS

| | | | |
|---|---|---|---|
| 4,026,478 | 5/1977 | Albert et al. | 241/24 |
| 4,843,144 | 6/1989 | Van Broekhoven et al. | 528/392 |
| 4,851,470 | 7/1989 | George | 524/612 |
| 4,880,903 | 11/1989 | Van Broekhoven et al. | 528/392 |
| 4,935,304 | 6/1990 | Danforth | 428/424.2 |

Primary Examiner—Paul R. Michl
Assistant Examiner—Tae H. Yoon
Attorney, Agent, or Firm—Denise Y. Wolfs

[57] ABSTRACT

Filled polymer compositions comprising a linear alternating polymer of carbon monoxide and at least one ethylenically unsaturated hydrocarbon and lesser amounts, on a volume basis, of a mineral wool fiber.

13 Claims, No Drawings

FILLED POLYKETONE BLEND CONTAINING A MINERAL WOOL FIBER

FIELD OF THE INVENTION

This invention relates to polyketone polymers, and, more particularly, to a filled polymer compound comprising a major portion of a polyketone polymer and lesser portions of mineral wool fiber on a volume basis.

BACKGROUND OF THE INVENTION

Polyketone polymers are relatively high molecular weight materials having established utility as premium thermoplastics in the production of shaped articles, such as containers for food and beverages and parts for the automotive industry, which are produced by processing the polyketone polymer according to well known methods. For some particular applications it is desirable to have properties which are somewhat different from those of the polyketone polymers. The more desirable properties of the polyketone polymers may be retained, and yet other properties improved, through the provision of a filled polymer compound. Reinforcing a polymer with a filler often provides a less expensive product, in addition to desirable properties for various applications.

Mineral-filled polyketone compounds with certain desirable properties are disclosed in U.S. Pat. No. 4,851,470 (George). The neat polyketone polymer has an unfortunate tendency to form chemical crosslinks at melt processing temperatures, as evidenced by a steady increase in melt viscosity as the polymer is processed. Mineral fillers frequently possess a variety of ionic species which are capable of intensifying melt processing problems for the polyketone polymer, such as accelerating crosslinking of the polymer, thereby limiting the melt processability of the filled polyketone compounds.

It is an objective of this invention to provide a mineral-filled polyketone polymer compound that exhibits superior melt stability during melt processing. The filled polyketone polymer compounds of the subject invention exhibit viscosity levels during processing that are unexpectedly lower than the viscosity levels typical for compounds filled with other fibrous mineral fillers, and yet exhibit mechanical properties at least equal to those of compounds filled with such other fibrous mineral fillers.

SUMMARY OF THE INVENTION

The present invention provides certain mineral-filled polymer compounds of linear alternating polymers of carbon monoxide and at least one ethylenically unsaturated hydrocarbon, filled with mineral wool fiber. The amount of mineral wool fiber present in the filled compounds, on a volume basis, may be from about 5 vol % to about 40 vol %. A preferred mineral wool fiber is a processed mineral fiber containing primarily calcium silicate and treated to reduce its shot content. In processing, the filled compounds exhibit melt stability superior to that of comparable fillers. The compounds demonstrate improved strength and stiffness, as well as dimensional stability. The invention also includes articles of manufacture prepared from, and coated with, such filled compounds.

DESCRIPTION OF THE INVENTION

The polyketone polymers which are employed as the major component of the filled polymer compounds of the invention are of a linear alternating structure and contain substantially one molecule of carbon monoxide for each molecule of unsaturated hydrocarbon. Suitable ethylenically unsaturated hydrocarbons for use as monomers in the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a monomer of ethylene for each unit incorporating a monomer of the second hydrocarbon. Preferably, there will be from about 10 units to about 100 units incorporating a monomer of ethylene for each unit incorporating a monomer of the second hydrocarbon. The polymer chain of the preferred polyketone polymers is therefore represented by the repeating formula

wherein G is the monomer of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the $-CO-(CH_2CH_2)-$ units and the $-(CO-G)-$ units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of and the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

U.S. Pat. No. 4,880,903 (VanBroekhoven et al.) discloses a linear alternating polyketone polymer of carbon monoxide, ethylene, and other olefinically unsaturated hydrocarbons, such as propylene. Processes for production of such polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven et al.) discloses a process for preparing polymers of carbon monoxide and at least one ethylenically unsaturated hydrocarbon using a catalyst comprising a compound of palladium, the anion of a non-hydrohalogenic acid having a pKa of below about 6 and a bidentate ligand of phosphorus.

The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

The second component of the filled polymer compounds of the invention comprises mineral wool fiber (fiberized blast furnace slag), or rock wool. Particularly preferred are the processed mineral fibers available from Jim Walter Resources, Inc. These processed mineral fibers are a milled form of mineral wool, from which most of the shot (non-fibrous material) has been removed. U.S. Pat. No. 4,026,478 (Albert et al.) describes a process for making such fibers.

The processed mineral fibers comprise primarily calcium silicate, with about 25 wt % oxides of aluminum, magnesium, and other lightweight metals also present. Fiber diameters range from about 1 $\mu$m, with an average diameter of about 5 $\mu$m and an average length of about 275 $\mu$m. The processed mineral fibers contain less than about 5 wt % non-fibrous material.

Mineral wool fibers, and processed mineral fibers, are synthetic (i.e. manufactured) materials. Most commercial mineral fillers are naturally occurring materials, although they may be refined to obtain a particular size range, and/or coated with a sizing material or coupling agent. Some naturally occurring mineral fillers, such as asbestos, exist in a fibrous form.

The filled polymer compounds of the invention comprise a major amount, on a volume basis, of the linear alternating polymer of carbon monoxide and at least one ethylenically unsaturated hydrocarbon with lesser amounts of mineral wool fiber. The amount of mineral wool fiber present in the filled compounds of the invention is not critical, as long as other important polymer properties for the intended use are not adversely affected. Amounts of mineral wool fiber present in the filled compounds, on a volume basis, may be from about 5 vol % to about 40 vol %, based on total composition, with amounts from about 20 vol % to about 30 vol % mineral wool fiber preferred. On a weight basis, the amount of mineral wool fiber present may be greater than 50 wt %, due to its greater density. Amounts of mineral wool fiber present in the filled compounds, on a weight basis, may be from about 10 wt % to about 60 wt % mineral wool fiber, based on total composition, with amounts from about 35 wt % to about 50 wt % mineral wool fiber being preferred for a wide variety of uses.

The method of producing the filled polymer compounds of the invention is not material so long as a relatively uniform distribution of the mineral wool filler throughout the polyketone is obtained. The mineral wool fiber filler exists as a discrete phase in the polyketone matrix. The method of producing the compounds is that which is conventional for polymeric fillers. In one modification, the mineral wool fiber filler and polyketone are mixed and passed through an extruder operating at high RPM to produce the filled compound as an extrudate. In an alternate modification, the components are blended in a mixing device which exhibits high shear.

The filled polymer compounds of the invention may also include other additives such as antioxidants, dyes, other fillers or reinforcing agents, fire resistant materials, mold release agents, colorants and other materials designed to improve the processability of the polymers or the properties of the resulting compound. Such additives are added prior to, together with, or subsequent to the blending of the polyketone and mineral wool fiber. The presence of these additives may affect the optimum level of mineral wool fiber for a given application.

The compounds are processed by methods such as extrusion and injection molding into sheets, films, plates and shaped parts. The compositions of the invention are particularly useful for the production of articles by multiple melting/crystallization cycles, and where elevated temperatures are likely to be encountered. Illustrative of such applications are the production of articles useful in both rigid and flexible packaging applications, and in both internal and external parts for automotive use.

While not wishing to be bound by any particular theory, it is believed that the advantageous results of the invention are obtained because the mineral wool fiber has ion exchange and acid scavenging properties that allow it to neutralize the effect of ionic or acidic species that accelerate a viscosity increase in the polyketone polymer in the melt state. Since few polymers exhibit such a tendency towards viscosity increase, the use of mineral wool fiber as a filler for the polyketone polymer is particularly advantageous, providing filled compounds that are readily processable into materials which exhibit useful mechanical properties and moderate reinforcement.

The invention is further illustrated by the following Examples which should not be regarded as limiting.

EXAMPLE 1

A linear alternating terpolymer of carbon monoxide, ethylene, and propylene (89/056) was produced in the presence of a catalyst composition formed from palladium acetate, trifluoroacetic acid and 1,3-bis[di(2-methoxyphenyl)phosphino]propane. The polyketone polymer had a melting point of about 223° C. and an LVN of about 1.1 dl/g when measured in m-cresol at 60° C. The polyketone polymer also contained 0.5% Ethanox ® 330 and 0.5% Nucrel ® 535.

EXAMPLE 2

Filled compounds were prepared of the polymer of Example 1 and two different types of mineral wool fiber, with and without a surface coating. The first was PMF 204, an untreated processed mineral fiber, and the second was PMF 204CX, a processed mineral fiber treated with a low level of a fatty-acid-type material for improved fiber dispersion during blending. Both PMF 204 and PMF 204CX were obtained from Jim Walton Resources, Inc. For comparison with the filled compounds of the invention, samples containing wallastonite with two different types of surface coating ("A" and "B") and gypsum whisker fibers were prepared in the same manner. Wallastonite is a naturally occurring calcium silicate mineral, which forms cylindrical particles upon grinding. Gypsum whisker fibers are manufactured from gypsum (calcium sulfate) and are commercially available as Franklin Fiber from the United States Gypsum Co. The filled compounds prepared are shown in Table 1.

All of the compounds were prepared by tumbling polyketone polymer powder with the mineral filler at the prescribed composition. Subsequently, melt compounding was performed in a 30 mm Haake co-rotating twin screw extruder, operating at about 200 rpm with a melt temperature of about 250° C. The viscosity of each sample was determined over time in the melt in a Rheometrics parallel plate rheometer operating at 275° C. at a frequency of 1 HZ. Table 1 lists the initial melt viscosity and the viscosity after both 10 and 28 minutes, as well as a ratio of the melt viscosity after 28 minutes to the initial melt viscosity.

TABLE 1

| Filler | Polyketone wt % (vol %) | Filler wt % (vol %) | Viscosity (Pa-sec) 0 min | 10 min | 28 min | Viscosity Ratio |
|---|---|---|---|---|---|---|
| None | 100 (100) | 0 (0) | 63 | 113 | 1030 | 16 |
| PMF 204 | 80 (90) | 20 (10) | 185 | 410 | 2049 | 11 |
| PMF 204 | 64 (80) | 36 (20) | 600 | 1354 | 3453 | 5.8 |
| PMF 204 | 51 (70) | 49 (30) | 1800 | 3453 | 21,640 | 12 |
| PMF 204CX | 80 (90) | 20 (10) | 300 | 650 | 2872 | 9.6 |
| Wallastonite A | 79 (90) | 21 (10) | 89 | 1455 | 30,270 | 340 |
| Wallastonite B | 79 (90) | 21 (10) | 89 | 522 | 7547 | 85 |
| Gypsum Whiskers | 78 (90) | 22 (10) | 280 | 668 | 9919 | 35 |

The addition of a solid filler to the polyketone polymer inherently results in a viscosity increase in the melt state for the filled compound. Thus, the ratio of melt viscosity after 28 minutes to the initial melt viscosity provides a relative measure of the viscosity increase that occurs when various fillers are added to the polyketone polymer.

The compounds filled with processed mineral fiber demonstrated superior melt stability, based on these rheometric data, relative to the other filled compounds. Only the processed mineral fiber filled compounds gave a viscosity ratio which was less than that of the neat polyketone polymer, indicating stabilization. The viscosity ratios for the compounds filled with wallastonite and gypsum whiskers (both commercial fillers) were significantly higher, indicating destabilization in the melt state.

EXAMPLE 3

Subsequent to compounding, specimens of the filled compounds of Example 2 were molded into plaques on a 25 ton Arburg injection molding machine. Molded specimens were stored over desicant until testing. Further testing was performed on "dry as molded" specimens.

Results of the thermal testing are shown in Table 2. The processed mineral fiber provided a significant improvement in the average coefficient of linear thermal expansion (CLTE) over the range from room temperature to 200° C., both in the direction parallel to, and perpendicular to the flow pattern in the injection molded test bar. The heat deflection temperature (HDT, determined at 264 psi) was not significantly improved.

TABLE 2

| Filler | Polyketone wt % (vol %) | Filler wt % (vol %) | CLTE (ppm/°C.) Parallel | Perpendicular | HDT (°C.) |
|---|---|---|---|---|---|
| None | 100 (100) | 0 (0) | 147 | 149 | 103 |
| PMF 204 | 80 (90) | 20 (10) | 72 | 114 | 107 |
| PMF 204 | 64 (80) | 36 (20) | 60 | 87 | 113 |
| PMF 204 | 51 (70) | 49 (30) | 50 | 111 | 118 |
| PMF 204CX | 80 (90) | 20 (10) | 80 | 121 | 97 |
| Wallastonite A | 79 (90) | 21 (10) | 93 | 92 | 144 |
| Wallastonite B | 79 (90) | 21 (10) | 82 | 125 | 116 |
| Gypsum Whiskers | 78 (90) | 22 (10) | 92 | 95 | 109 |

Results of the mechanical testing are shown in Table 3. The mechanical property data indicate that processed mineral fiber is an acceptable filler for the polyketone polymer, and provides filled compounds with properties which are comparable to those made with other fillers, such as wallastonite and gypsum whiskers.

Other embodiments of the invention will be apparent to those skilled in the art from a consideration of this specification, or by practice of the invention described herein. It is intended that the specification and examples be considered as exemplary only, with the true scope and spirit of the invention being indicated by the following claims.

TABLE 3

| Filler | Polyketone wt % (vol %) | Filler wt % (vol %) | Flexural Modulus (kpsi) | Flexural Strength (psi) | Tensile Strength (psi) | Elongation (%) | Impact Properties | |
|---|---|---|---|---|---|---|---|---|
| | | | | | | | Izod (ft-lb/in) | Gardner (in-lbs) |
| None | 100 (100) | 0 (0) | 259 | 9,260 | 9,130 | 86 | 1.93 | 126 |
| PMF 204 | 80 (90) | 20 (10) | 406 | 10,110 | 7,810 | 37 | 1.28 | 15 |
| PMF 204 | 64 (80) | 36 (20) | 491 | 9,890 | 6,240 | 23 | 0.96 | 10 |
| PMF 204 | 51 (70) | 49 (30) | 609 | 9,740 | 5,410 | 17 | 0.89 | 9 |
| PMF 204CX | 80 (90) | 20 (10) | 415 | 10,280 | 7,900 | 38 | 1.40 | 16 |
| Wallastonite A | 79 (90) | 21 (10) | 428 | 11,050 | 7,980 | 19 | 1.11 | 8 |
| Wallastonite B | 79 (90) | 21 (10) | 391 | 10,260 | 7,870 | 19 | 1.12 | 10 |
| Gypsum Whiskers | 78 (90) | 22 (10) | 386 | 10,220 | 7,750 | 28 | 1.05 | 38 |

What is claimed is:

1. A filled polymer composition comprising a linear alternating polyketone polymer and from about 5 vol % to about 40 vol %, based on total composition, of a mineral wool fiber.

2. The composition of claim 1 wherein the polyketone polymer is of the repeating formula

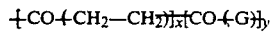

wherein G is a monomer of an ethylenically unsaturated hydrocarbon of at least 3 carbon atoms, polymerized through the ethylenic unsaturation, and the ratio of y:x is no more than about 0.5.

3. The composition of claim 2 wherein y is 0.

4. The composition of claim 2 wherein the ratio of y:x is from 0.01 to about 0.1.

5. The composition of claim 4 wherein G is a monomer of propylene.

6. The composition of claim 2 wherein the processed mineral fiber is present in a quantity of from about 20 vol % to about 30 vol %, based on total composition.

7. A filled polymer composition comprising a linear alternating polyketone polymer and from about 5 vol % to about 40 vol %, based on total composition, of a processed mineral fiber.

8. The composition of claim 7 wherein the polyketone polymer is of the repeating formula

wherein G is a monomer of an ethylenically unsaturated hydrocarbon of at least 3 carbon atoms, polymerized through the ethylenic unsaturation, and the ratio of y:x is no more than about 0.5.

9. The composition of claim 8 wherein the ratio of y:x is from 0.01 to about 0.1.

10. The composition of claim 9 wherein G is a monomer of propylene.

11. The composition of claim 8 wherein y is 0.

12. The composition of claim 11 wherein the processed mineral fiber is present in a quantity of from about 20 vol % to about 30 vol %, based on total composition.

13. An article manufactured from the composition of claim 7.

* * * * *